United States Patent [19]

Hughes et al.

[11] 4,244,078
[45] Jan. 13, 1981

[54] METHOD AND APPARATUS FOR CLEANING FILM

[75] Inventors: Richard J. Hughes, Mt. Prospect; Howard Bowen, Wilmette, both of Ill.

[73] Assignee: Research Technology, Inc., Lincolnwood, Ill.

[21] Appl. No.: 33,729

[22] Filed: Apr. 26, 1979

[51] Int. Cl.³ .............................................. A47L 5/38
[52] U.S. Cl. .................................. 15/302; 15/306 A; 68/18 C; 134/64 P; 134/122 P
[58] Field of Search ................. 15/302, 306 A, 306 R; 68/18 C; 134/64 P, 122 P, 1

[56] References Cited

U.S. PATENT DOCUMENTS

| | | | |
|---|---|---|---|
| 1,248,137 | 3/1917 | Vose et al. ...................... | 15/306 AX |
| 2,967,119 | 1/1961 | Gutterman ........................... | 134/1 |
| 3,040,361 | 6/1962 | Baumbach ...................... | 15/306 A X |
| 3,099,584 | 7/1963 | Walsh ...................................... | 134/1 |
| 3,518,713 | 7/1970 | Krause ............................... | 15/306 A |
| 3,582,400 | 6/1971 | Miller ..................................... | 134/1 |
| 3,600,223 | 8/1971 | Glick et al. .............................. | 134/1 |
| 3,635,762 | 1/1972 | Otto et al. ............................... | 134/1 |
| 3,737,941 | 6/1973 | Miller et al. ....................... | 15/302 X |
| 3,778,862 | 12/1973 | Kesler, Jr. ......................... | 15/306 A |
| 4,202,073 | 5/1980 | Hughes ............................. | 15/316 R |
| 4,407,543 | 2/1922 | Hubbard ........................... | 15/306 A |

Primary Examiner—Christopher K. Moore
Attorney, Agent, or Firm—Hill, Van Santen, Steadman, Chiara & Simpson

[57] ABSTRACT

An apparatus for ultra-sonically cleaning any information bearing material, web, sheet, fiche, film or similar strip material is operable in two modes. The first mode is directed to cleaning the film, and employs a pair of air nozzles for nonevaporatively stripping cleaning solvent from the surface of the film, after the film has been immersed in the solvent. The action of the air nozzles creates a mist of solvent about the nozzles, which is condensed by a plurality of cooling coils and collected, and circulates same through a purification system and returns the solvent to the cleaning tank for subsequent reuse in the film cleaning mode of operation. The air emerging from the nozzles is returned to the air compressor, thereby forming a closed loop compressor system which minimizes escape of solvent vapors into the atmosphere. After a period of use in the film cleaning mode of operation, a second solvent reclaiming mode of operation drains the contaminated solvent from the cleaning tank, and circulates same through a purification system and returns the solvent to the cleaning tank for subsequent reuse in the film cleaning mode of operation. Both modes use the same cooling coils and purification system.

17 Claims, 2 Drawing Figures

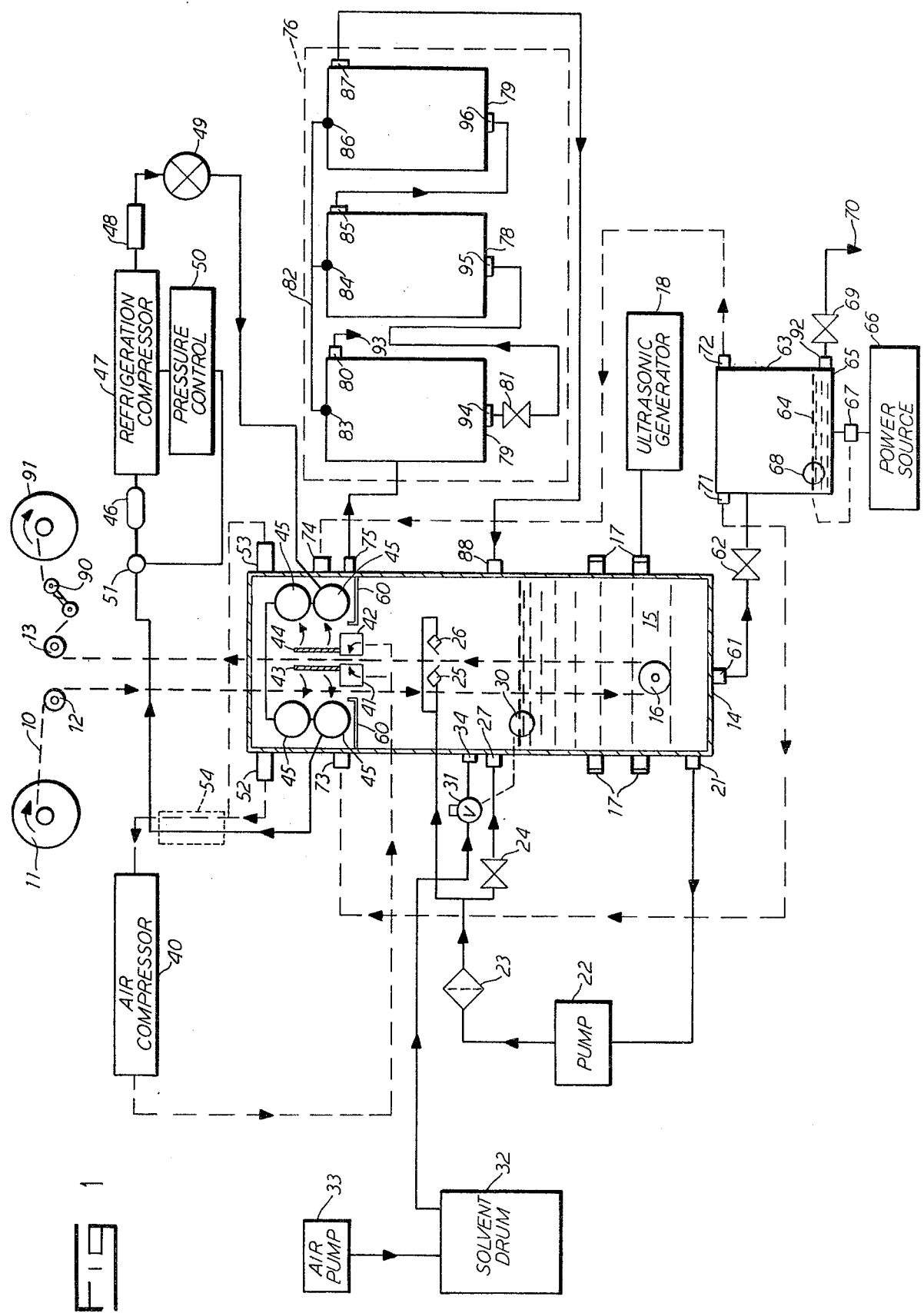

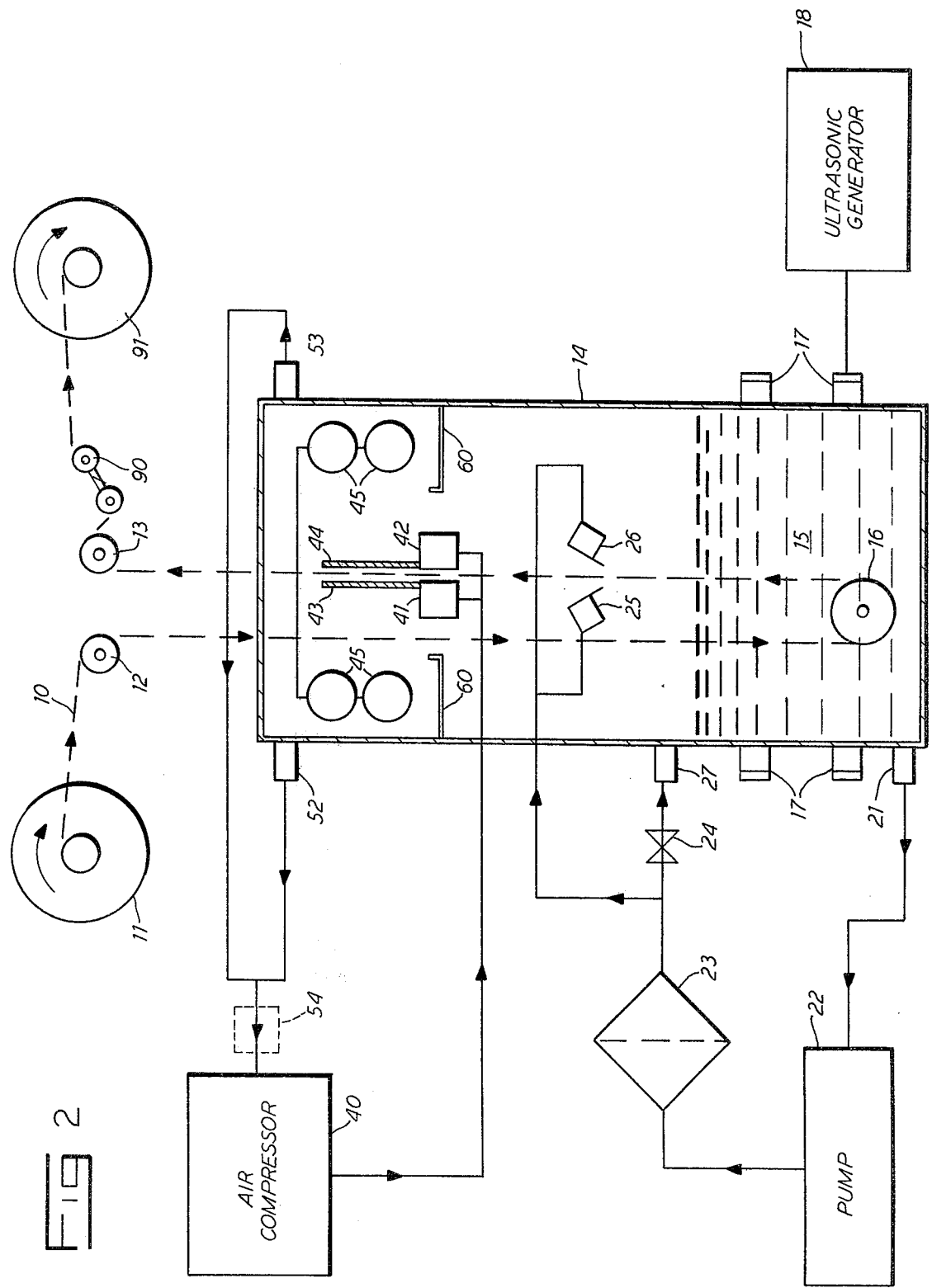

METHOD AND APPARATUS FOR CLEANING FILM

BACKGROUND OF THE INVENTION

1. Field of the Invention

This invention relates to an apparatus employing solvent for the ultra-sonic cleaning of film or similar strip material, and for reclaiming the solvent used to clean the film for subsequent reuse.

2. Description of the Prior Art

The use of high energy sound waves in a liquid medium for the cleaning of various materials is well-known in the film cleaning as well as other industries. In the film cleaning industry, the liquid medium used to conduct the sound waves to the film to be cleaned is itself a cleaning solvent. When such ultra-sonic cleaners are employed in the film industry, the most difficult problem to overcome is removing any cleaning solvent which adheres to the surface of the film after it emerges from the solvent bath. One means for removing such unwanted solvent is subjects the film to high pressure air directed at both sides of the film by appropriately designed air nozzles, the action of the air on the film surface literally stripping away the excess solvent and contaminant in non-evaporative fashion.

The action of such air on the film produces a mist of solvent in the immediate area surrounding the nozzles. The solvents employed in the film cleaning industry are of a nature such that such vapors could be dangerous to humans if inhaled in sufficient quantity for long periods of time. All presently employed devices for disposing of such vapors involve means for directing the fumes away from the atmosphere inhaled by cleaning apparatus operators, but eventually result in depositing the vapors into the atmosphere at another point.

Devices for reclaiming the solvent used to clean film are also known in the film cleaning industry. All such devices presently involve means for removing the contaminated solvent from the film cleaning apparatus and transporting same to a separate solvent reclaiming apparatus. After being purified by the separate solvent cleaning apparatus the solvent is then again transported back to the film cleaning apparatus. Two separate devices are thus required for the operations of cleaning the film and purifying the solvent, and frequently the transportation of solvent between the two devices must be done manually.

SUMMARY OF THE INVENTION

It is an object of this invention to provide an apparatus which combines the operations of film cleaning and solvent reclaiming in one device.

It is a further object of this invention to provide an apparatus for cleaning film which minimizes the escape of solvent vapors into the surrounding atmosphere.

According to the invention, dirty or contaminated film or similar strip material is moved through a solvent bath by a reel mechanism. While immersed in the solvent bath, the film is subjected to high energy sound waves which remove substantially all contaminants from the surface of the film. Upon emerging from the solvent bath, a quantity of solvent adheres to the surface of the film and must be removed. The film passes between a pair of spray nozzles which direct a high pressure spray of solvent at the film surfaces, removing a large amount of the unwanted solvent. The final traces of solvent are removed from the surface by passing the film between two air nozzles which are designed to direct air at the surfaces of the film in such a manner so as to non-evaporatively strip the remaining solvent from the surface of the film.

The action of the air nozzles on the film produces a mist of solvent in the immediate area surrounding the nozzles. A plurality of cooling coils are in the vicinity of the air nozzles, and condense the solvent mist produced by the action of the nozzles, the condensed solvent being collected in a trough disposed below the coils. The air, now substantially solvent vapor free, is then returned to the air compressor which provides air to the nozzles. The air is first passed through a second cooling apparatus to further insure that a minimum of solvent vapors will return to the air compressor and thus the air nozzles. A closed loop compressor system is thus formed, which minimizes the escape of potentially dangerous solvent vapors into the atmosphere surrounding the cleaning apparatus.

During the cleaning mode, the solvent is constantly being condensed and passed through the purification system. After a period of use in the film cleaning mode, the solvent comprising the solvent bath and the solvent collected from the condensing coils become contaminated and must be purified or replaced. A second mode of operation of the invention drains the solvent from the cleaning tank and the collecting trough and transports same to a distilling tank, where the solvent is heated to a point of vaporization. The solvent vapors are then transported to the above mentioned cooling coils used in the film cleaning mode, and there the vapor is condensed and again collected. The condensed solvent is then transported to a three stage solvent purification system consisting of a water separator, a dryer, and a chemical adjustment stage that adjusts the pH of the solvent, which may have become slightly acidic during the cycle of operation. The purified solvent is then returned to the solvent tank for reuse in the film cleaning mode.

BRIEF DESCRIPTION OF THE DRAWINGS

FIG. 1 is a schematic diagram of the film cleaning and solvent reclaiming apparatus of the invention.

FIG. 2 is a simplified schematic diagram showing only the film cleaning portion of the apparatus.

DESCRIPTION OF THE PREFERRED EMBODIMENTS

Operation of the invention in the film cleaning and solvent reclaiming modes of operation is shown in FIG. 1. FIG. 2 shows only those portions of the apparatus which are directed to the film cleaning mode of operation, however, the numbers thereon correspond to the numbers used for identification in FIG. 1.

Referring to FIG. 2, a film 10, or similar strip material, is unwound from feed reel 11 by means of movement imparted to the film by drive roller 13. The film 10 moves into tank 14 and is immersed in solvent 15 contained therein. The film goes around roller 16, which is situated beneath the solvent level in tank 14, and reverses direction to continue upward to drive roller 13. The film then passes through tension arm 90 and is wound on take-up reel 91. The solvent 15 may be 1,1,1-trichloroethane, or other suitable cleaning solvent.

During operation in the film cleaning mode, a plurality of transducers 17 attached to tank 14 supply ultrasonic energy to the solvent 15 contained in tank 14, thereby providing the means to remove dirt and contaminants from the surface of the film 10. The transducers may operate at a suitable frequency which effectuates the cleaning, such as 25 kHz. The transducers 17 are connected in parallel, and may number 8, as shown in FIG. 2, or any number needed to effectuate the desired cleaning. The electrical connections of the transducers 17 are not depicted in FIG. 2; other than connection to an ultra-sonic generator 18.

Upon emerging from solvent 15, a thin layer of solvent adheres to the surface of film 10 and must be removed. Film 10 passes between high pressure spray nozzles 25 and 26 disposed slightly above the level of solvent 15 inside tank 14. The spray nozzles 25 and 26 draw solvent from the tank 14 from an outlet port 21 on the bottom of the tank 14 by means of a pump 22. The pump 22 further transfers the solvent 15 from the tank 14 through a fluid filter 23 and then to the spray nozzles 25 and 26. A valve 24 is employed to maintain the desired spray nozzle pressure at the nozzles 25 and 26. Excess solvent is returned to the tank 14 via an inlet port 27.

The action of spray nozzles 25 and 26 removes a substantial amount of solvent from the surface of the film 10, however, a thin layer of solvent still remains upon the surface and must be removed. To remove all traces of solvent from the surfaces of the film 10, the film passes between a pair of air directing means which are two air nozzles 41 and 42 which direct a high velocity air flow at the surfaces of the film 10. The volume of air emerging from the nozzles 41 and 42 is distributed by multiple small jets disposed on one surface of the nozzles 41 and 42. The jet-containing surfaces of respective nozzles 41 and 42 are disposed closely adjacent so that a narrow gap only slightly wider than the thickness of the film 10 exists. A means (not shown) may be provided to allow enlargement of the gap if a thickened film portion, such as resulting from a splice, enters the gap. The high velocity air flow emerging from the nozzles 41 and 42 is created by means of an air compressor 40. The action of the high velocity air flow emerging from the air nozzles 41 and 42 non-evaporatively strips all traces of solvent from the surfaces of the film 10 and creates a mist of solvent in the localized area about the nozzles 41 and 42. To prevent this mist from redepositing solvent upon the surfaces of the film 10, baffles 43 and 44 are attached to and disposed immediately above spray nozzles 41 and 42 respectively. The film passes between baffles 43 and 44 and out of tank 14, without contacting the solvent mist surrounding air nozzles 41 and 42; and is wound on take-up reel 91.

A film tensioning arm 90 automatically shuts off the apparatus when the end of the film 10 is reached.

Because most solvents which have effective cleaning properties, and are thus suitable for use in a film cleaning appartus such as the present invention, are also potentially dangerous when inhaled in large quantities for long periods of time by humans, it is desirable that means be provided on the tank so that the solvent mist created by the action of the air from the air nozzles 41 and 42 be controlled and its escape into the atmosphere minimized. A conventional refrigeration system consisting of an accumulator 46, a refrigeration compressor 47, a dryer 48, an expansion valve 49, a pressure control 50, and a sensor 51 is employed to operate condensing coils 45. The coils 45 surround the air nozzles 41 and 42 inside the tank 14. Four condensing coils 45 are shown in FIG. 2, however, a greater or smaller number may be employed as needed.

The condensing coils 45 surround the area in which the solvent mist created by the air action of air nozzles 41 and 42 exists. The solvent mist condenses on the coils 45 and drips to a trough 60 disposed below the coils in the tank 14 and is collected therein.

The air which emerged from the air nozzles 41 and 42, now substantially devoid of solvent vapors due to the condensing action of the coils 45, is drawn from the tank 14 by outlet ports 52 and 53. Any stray solvent vapors which may still remain in the air are removed by a second cooling chamber 54. The air then returns to the air compressor 40, and is recirculated for reintroduction via air nozzles 41 and 42. A completely closed loop compressor system is thus formed, substantially minimizing the amount of solvent vapors which escape into the ambient atmosphere. The hazards of inhaling such vapors are thus greatly minimized, and humans may work in the area immediately surrounding the film cleaning apparatus without being affected by the solvent fumes.

As shown in FIG. 1, a constant solvent level is maintained in the tank 14 by means of a float 30 resting on the surface of the solvent 15. The float 30 actuates a solenoid valve 31 which is connected to a flow line from a drum 32 containing solvent. A pressure is maintained in the drum 32 by air pump 33, thus when the float 30 actuates the solenoid valve 31 to open the flow line from the drum 32, the pressure from air pump 33 forces solvent through the valve 31 and through an inlet port 34 into the tank 14. When the desired level of solvent 15 in the tank 14 is reached, the float 30 shuts off the solenoid valve 31, stopping the solvent flow from the drum 32.

After a period of operation in the film cleaning mode, the solvent 15 in the tank 14 and the solvent collected in the pan 60 become contaminated and must be purified or replaced. The apparatus of the present invention is operable in a second solvent reclaiming mode to purify the solvent and return same to the tank 14.

When operation in the solvent reclaiming mode is desired, valve 62 is opened allowing gravity flow of the solvent 15 in the tank 14 from outlet port 61 to a distilling tank 63. The solvent 64 in the distilling tank 63 is then heated to boiling temperature by means of a heating element 65 attached to the distilling tank 63. The boiling point of the types of solvents used in the film cleaning industry is generally substantially below that of water. Specifically, the boiling point of 1,1,1-trichlorethane is 165.2° F. When heated, the solvent will thus vaporize, while most of the water in the distilling tank remains in liquid form. The solvent vapors leave the distilling tank 63 via outlet ports 71 and 72 and are transported to the area surrounding the cooling coils 45 in the tank 14, entering the tank via inlet ports 73 and 74.

A float 68 is attached to a sensing valve 67 such that when substantially all of the solvent 64 has been vaporized and has left the distilling tank 63, the sensing valve 67 is actuated to shut off the power source 66 which supplied the power to the heating element 65. Water and other contaminants remaining in the tank can then be removed from the distilling tank 63 via outlet port 92, upon the opening of a valve 69. The contaminants and water can be flushed or allowed to flow by gravity to a drain 70.

The solvent vapors surrounding the condensing coils 45, still operated by the refrigeration system described in connection with the film cleaning mode of operation, are condensed by the coils 45 and collected in the pan 60. This condensed solvent vapor, along with solvent collected in the trough 60 during the film cleaning mode of operation flow by gravity from the tank 14 via an outlet port 75 to a solvent purification system 76.

The solvent purification system 76 consists of three stages. Solvent flow through the purification system 76 is entirely by gravity flow. The first stage 77 consists of a water separator, which further removes any water which is present from that portion of the entering solvent which was collected in the trough 60 during the film cleaning mode of operation. The solvent which was distilled in distilling tank 63 will already have had substantially all water separated therefrom, however, the water separator stage 77 further removes all traces of water. The collected removed water exits, the water separator stage 77 via outlet port 80 and is disposed of through a drain 93, which may be connected to the drain 70. Opening of a purging valve 81 allows gravimetric flow of the solvent from outlet port 94 in the first stage 77 to inlet port 95 of the second stage 78 in the solvent purification system 76. It will be understood that the placement of the inlet and outlet ports of the various stages of the solvent purification system 76 in FIG. 1 do not necessarily reflect the actual placement on the parts comprising the system 76 so as to effectuate gravity flow of the solvent.

The second stage 78 of the solvent purification system 76 is a dryer which is packed with special resin, such as, but not limited to a type supplied by Dow Chemical Co. under the trade name "Dowex No. HCRW2-H," and which is dried prior to being packed in the second stage 78. The solvent then flows by gravity from outlet port 85 in the second stage 78 to inlet port 96 of the third stage 79 of the solvent purification system 76. During operation in both modes, the solvent 15 may become slightly acidic with use. The third stage 79 of the solvent purification system 76 subjects the solvent to a "chemical corrector," such as calcium carbonate. This restores the pH of the solvent to any preferred pH level of approximately seven. The solvent then exits the third stage 79 via outlet port 87 and returns by gravity flow to the tank 14 via inlet port 88. The purified solvent is thus again deposited in the tank 14, and is available for reuse in the film cleaning mode of operation.

Each stage of the solvent purification system 76 is equipped with a vent port such as port 83 in the first stage 77, port 84 in the second stage 78 and port 86 in the third stage 79. The ports are connected to a common vent tube 82 which relieves any pressure built up by gases and also prevents siphoning which may be created in any stage of the solvent purification system 76.

Although various minor modifications may be suggested by those versed in the art, it should be understood that we wish to embody within the scope of the patent warranted hereon all such embodiments as reasonably and properly come within the scope of our contribution to the art.

We claim as our invention:

1. A film cleaning apparatus comprising:
   a solvent bath;
   a means for moving film through said solvent bath;
   a means disposed following said bath for non-evaporatively stripping solvent from film exiting said bath;
   a condensing means for collecting vaporized solvent removed from said film preventing escape of solvent vapor into the ambient atmosphere; and
   a reclaiming means subsequently exclusively utilizing said condensing means for selectively subjecting returned solvent and said solvent bath to a contaminant removing purifier for reuse for cleaning film.

2. The apparatus of claim 1 wherein said reclaiming means includes a mechanical water separator through which condensed solvent is passed to chemically purify said condensed solvent.

3. The apparatus of claim 1 wherein said purifier includes a resin-type absorber through which said condensed solvent is passed to purify said condensed solvent by removing water and water soluble impurities therefrom.

4. The apparatus of claim 1 wherein said purifier is a chemical purifier through which said condensed solvent is passed to purify said condensed solvent by correcting the pH of the solvent by removal of acidic impurities.

5. The apparatus of claim 4 wherein calcium carbonate is utilized as an active ingredient in said chemical purifier.

6. The film cleaning apparatus of claim 1 wherein said solvent is contained in a tank having a plurality of ultrasonic transducers for ultra-sonically cleaning said film.

7. The film cleaning apparatus of claim 1 wherein said means for non-evaporatively stripping solvent from said film is a pair of nozzles connected to an air compressor, said nozzles disposed in close proximity to the film following said solvent bath such that film passes between said air nozzles and is subjected to high pressure air from multiple air jets disposed in said nozzles which strip solvent from surfaces of said film.

8. The film cleaning apparatus of claim 1 wherein a pair of solvent spray nozzles drawing solvent from said solvent bath is disposed between said solvent bath and said means for non-evaporatively stripping solvent from said film and wherein said film is moved between said solvent spray nozzles by said film moving means and is subjected to a spray of cleaning solvent.

9. The film cleaning apparatus of claim 1 wherein said condensing means is at least one condensing coil connected to a refrigeration system, said coil surrounding said means for stripping solvent from said film and condensing solvent vapors formed during the stripping process.

10. A film cleaning apparatus comprised of:
    an air compressor;
    a film cleaning tank containing film cleaning solvent;
    a plurality of ultra-sonic transducers coupled to said film cleaning tank;
    a means for moving a strip of film having a surface into said film cleaning means and contacting said film cleaning solvent therein;
    a pair of solvent spray nozzles disposed above said film cleaning solvent in said film cleaning tank such that said film passes between said spray nozzles and is subjected to a spray of cleaning solvent to rinse said film;
    a pair of air directing means connected to said air compressor in close proximity to a film path following said cleaning means such that said film passes between said air directing means and is subjected to high pressure air from said air directing means which strips solvent from the surface of said film;

a plurality of condensing coils connected to a refrigeration system, said coils disposed in a path following said air nozzles and said coils condensing solvent vapor produced as an incidental result of said stripping of said solvent;

a collector disposed beneath said condensing coils, said collector accumulating said condensed solvent as said condensed solvent drips off said condensing coils;

a means on said tank for substantially minimizing escape of solvent mist into the surrounding atmosphere from said tank;

a means for returning air ejected from said air nozzles to said compressor such that a closed loop air transfer path is formed; and a means for removing said solvent from said collector and said bath directing said solvent to a means including said condensing coils subsequently operable for purifying said solvent and for returning said solvent to said tank.

11. The apparatus of claim 10 wherein said means operable for purifying said solvent includes:

a means for emptying said solvent from said film cleaning tank into a solvent distilling tank;

a means for vaporizing said solvent in said solvent distilling tank by elevating the temperature of said solvent in said distilling tank to a solvent boiling point;

a means for transferring solvent vapor from said solvent distilling tank to a localized area about said condensing coils, said coils condensing said solvent vapor and condensed solvent being collected by said collector disposed beneath said coils;

a solvent purification system;

a means for transferring condensed solvent to said solvent purification system; and a means for returning said solvent to said film cleaning tank after said solvent has passed through said solvent purification system.

12. The film cleaning apparatus of claim 11 wherein said solvent distilling tank is equipped with a float which actuates a valve to shut off a power supply supplying power to said means for elevating the temperature of said solvent in said solvent distilling tank.

13. The film cleaning apparatus of claim 11 wherein said solvent distilling tank is equipped with a valve which may be opened to allow flow of the contents of the solvent distilling tank into a drain.

14. The film cleaning apparatus of claim 11 wherein said solvent purification system consists of:

a water separator stage;
a dryer stage; and
a pH correcting stage.

15. The film cleaning apparatus of claim 11 wherein a pair of baffles are attached to and disposed in the film path following each one of said pair of air directing means such that film moves between said pairs of baffles to prevent said vapors from recondensing on said film.

16. The film cleaning apparatus of claim 11 wherein said air emerging from said air directing means passes through a second cooling apparatus after having passed over said refrigeration coils and prior to returning to said air compressor to further condensed solvent vapors and remove said solvent vapors from said air.

17. The film cleaning apparatus of claim 11 wherein a constant solvent level is maintained in said solvent tank by means of a float which rests on the surface of the solvent in the solvent tank, said float actuating a solenoid valve which opens to allow inlet of solvent from a solvent drum, said solvent in said solvent drum being pressurized to flow into said solvent tank by means of an air pump.

* * * * *